United States Patent [19]
Arai

[11] Patent Number: 5,609,801
[45] Date of Patent: Mar. 11, 1997

[54] CLAMPING METHOD OF INJECTION AND COMPRESSION MOLDING MACHINE

[75] Inventor: Tsuyoshi Arai, Nagano, Japan

[73] Assignee: Nissei Plastic Industrial Co., Ltd., Nagano-ken, Japan

[21] Appl. No.: 422,783

[22] Filed: Apr. 17, 1995

[30] Foreign Application Priority Data

Apr. 20, 1994 [JP] Japan ..................... 6-106078

[51] Int. Cl.$^6$ ................................ B29C 45/56
[52] U.S. Cl. .............. 264/40.5; 264/328.7; 425/150; 425/575
[58] Field of Search ............... 264/40.1, 40.5, 264/328.7; 425/150, 168, 575

[56] References Cited

U.S. PATENT DOCUMENTS

| | | | |
|---|---|---|---|
| 4,281,977 | 8/1981 | Farrell ................ | 425/150 |
| 4,828,769 | 5/1989 | Maus et al. ........... | 264/328.7 |
| 4,832,884 | 5/1989 | Speck et al. .......... | 425/150 |
| 4,923,383 | 5/1990 | Kurumaji et al. ...... | 425/150 |
| 5,059,365 | 10/1991 | Hertzer et al. ....... | 425/150 |
| 5,354,525 | 10/1994 | Fujimoto et al. ...... | 425/150 |
| 5,370,518 | 12/1994 | Sasaki et al. ........ | 425/150 |

FOREIGN PATENT DOCUMENTS

| | | | |
|---|---|---|---|
| 62-207612 | 9/1987 | Japan ............. | 264/328.7 |
| 63-5919 | 1/1988 | Japan ............. | 425/150 |
| 63-9247 | 2/1988 | Japan . | |

*Primary Examiner*—Jill L. Heitbrink
*Attorney, Agent, or Firm*—Birch, Stewart, Kolasch & Birch, LLP

[57] ABSTRACT

A clamping method of an injection and compression molding machine, includes the steps of moving a movable mold 2 up to a pre-clamping position Sf located before a final clamping position Se, starting injection and filling of resin at the pre-clamping position Sf, and moving the movable mold 2 up to the final clamping position Se through high-pressure clamping; wherein the movable mold 2 is moved from a mold opening position So to the final clamping position Se and thereafter high-pressure empty clamping without injection and filling of resin is performed and a position to which the movable mold 2 is moved backward by a set value Xs from the position where the high-pressure empty clamping is performed is set as the pre-clamping position Sf, before moving the movable mold 2 from the mold opening position So to the pre-clamping position Sf. Thereby, an accurate movable-mold pre-clamping position is set and the weight of a molded part, the amount of gas to be released, and the transfer property are stabilized.

7 Claims, 3 Drawing Sheets

BACK-GROUND

CLAMPING METHOD OF INJECTION AND COMPRESSION MOLDING MACHINE

BACKGROUND OF THE INVENTION

1. Field of the Invention

The present invention relates to a clamping method of an injection and compression molding machine, comprising the steps of temporarily stopping a movable mold at a pre-clamping position located before a final clamping position and performing high-pressure clamping in accordance with the filling of resin.

2. Description of the Relevant Art

An injection and compression molding machine is known wherein the injection and compression molding machine normally performs clamping as shown in FIG. 4. First, a movable mold is moved forward from a mold opening position to a preset slowdown start position at a high speed (step S21). When the mold reaches the slowdown start position, it is moved to the pre-clamping position located before the final clamping position while slowly decreasing the speed (steps S22 and S23). When the movable mold reaches the pre-clamping position, it is stopped to start injection and filling of the resin under an above state (steps S24, S25, S26, and S27). Then, the movable mold is moved up to the final clamping position during or after injection and filling of resin to perform high-pressure clamping (step S28). Thereafter, mold opening including a cooling process is performed (step S29). Because this type of the injection and compression molding machine slightly opens the mold at the time of injection and filling of resin, it has advantages wherein the release of gas from the mold is accelerated and the flowability of resin is improved. Moreover, because the machine performs high-pressure clamping, it has an advantage wherein the transfer property of resin to the mold is improved.

For an injection and compression molding machine, it is important to accurately move a movable mold up to a pre-clamping position in order to improve the molding quality. inaccurate setting of the pre-clamping position would cause an imperfect molding due to insufficient or excessive filling of the resin.

Therefore, a movable mold has been moved from a mold opening position to a preset pre-clamping position by using a high-accuracy linear scale disclosed in the official gazette of Japanese Patent Publication No. 63(1988)-9247 and thereby accurately detecting a moving position of the movable mold so far.

However, though an existing clamping method makes it possible to accurately move a movable mold from a mold opening position to a pre-clamping position, it has problems wherein an accurate position is not always set when viewed from a fixed mold and the weight of a molded part, the amount of gas to be released, and the transfer property are not stabilized because of various error factors such as deformation of a tie bar for movably supporting the movable mold due to heat or tension, clearance of a mechanical structure, and setting error of a position detector such as a linear scale.

SUMMARY OF THE INVENTION

It is an object of the present invention to provide a clamping method of an injection and compression molding machine, making it possible to stabilize the weight of a molded part, the amount of gas to be released, and moreover the transfer property by setting an accurate pre-clamping position of a movable mold.

To achieve the above object, the present invention uses a clamping method of an injection and compression molding machine, comprising the steps of moving a movable mold 2 from a mold opening position So to a pre-clamping position Sf located before a final clamping position Se, starting injection and filling of resin at the pre-clamping position Sf, and moving the movable mold 2 up to the final clamping position Se through high-pressure clamping; wherein the movable mold 2 is moved from the mold opening position So to the final clamping position Se and thereafter high-pressure empty clamping free from resin is performed and a position where the movable mold 2 is moved backward by a set value Xs from the position where the high-pressure clamping is performed is set as the pre-clamping position Sf, before moving the movable mold 2 from the mold opening position So to the pre-clamping position Sf.

In this case, the high-pressure empty clamping is performed only for a set time Ts by the best embodying mode. Moreover, the movable mold 2 is moved from the mold opening position So to a preset slowdown start position Sd at a high speed and the moving speed of the movable mold 2 is slowly decreased from the slowdown start position. Sd to the final clamping position Se.

By performing the above high-pressure empty clamping, a stress which is the same as that for an actual molding is added to the movable mold 2. Therefore, the position where the high-pressure empty clamping meets the positional condition when resin is actually injected is achieved. Therefore, by moving the movable mold 2 backward from the position where the high-pressure empty clamping is performed by the set value Xs and setting the position to which the movable mold 2 is moved backward as the pre-clamping position Sf, the position Sf serves as an accurate pre-clamping position according to an actual amount of resin to be injected and various error factors such as deformation of a tie bar due to heat or tension, clearance of a mechanical structure, and setting error of a position detector such as a linear scale are eliminated.

DETAILED DESCRIPTION OF THE PREFERRED EMBODIMENTS

Preferred embodiments of the present invention are described below by referring to the accompanying drawings.

First, the constitution of an injection and compression molding machine capable of executing the clamping method of the present invention is described below by referring to FIG. 3.

Figure 3:
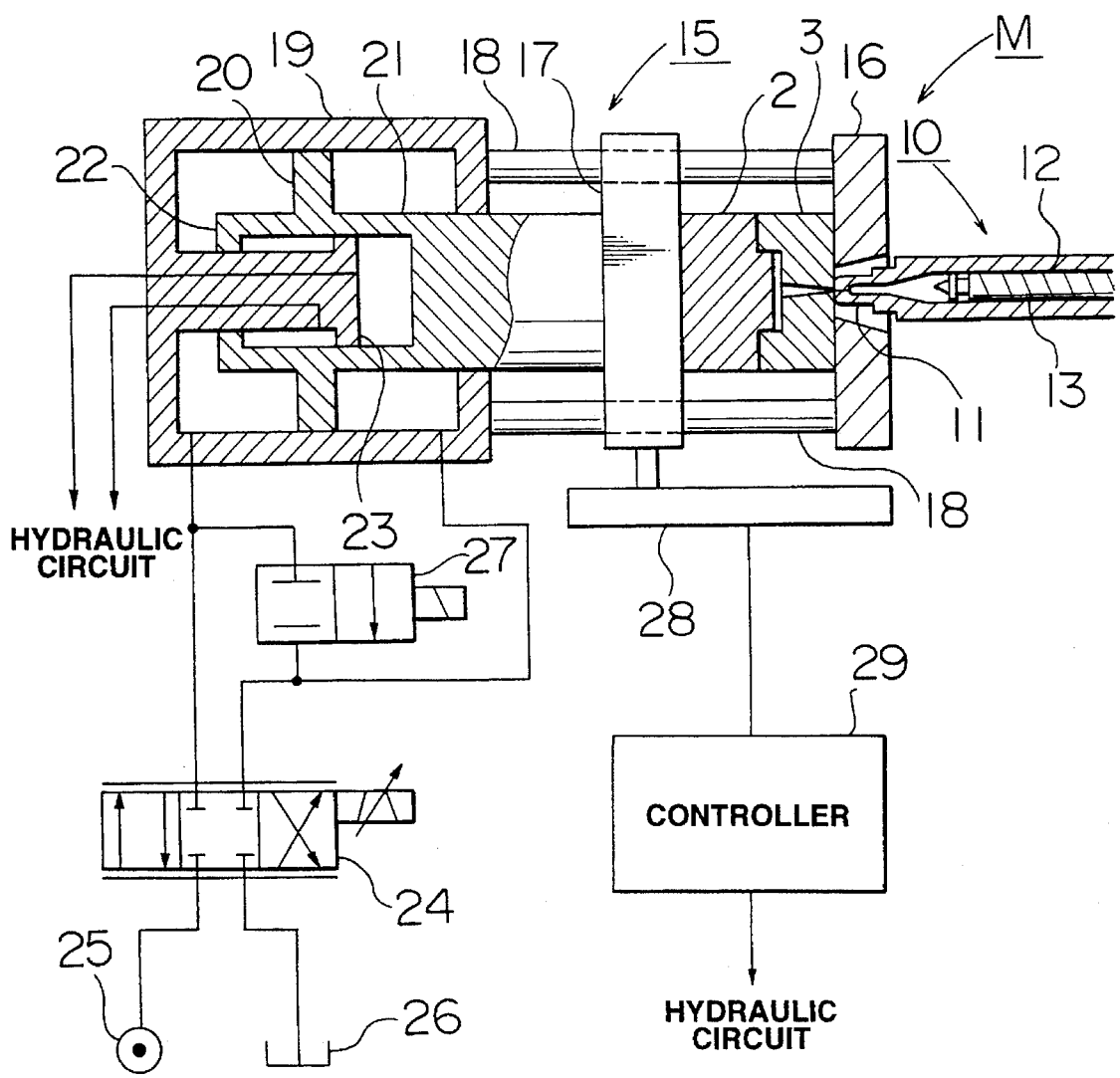
FIG. 3 is a block of the whole injection and compression molding machine for executing the clamping method.
Figure 4:
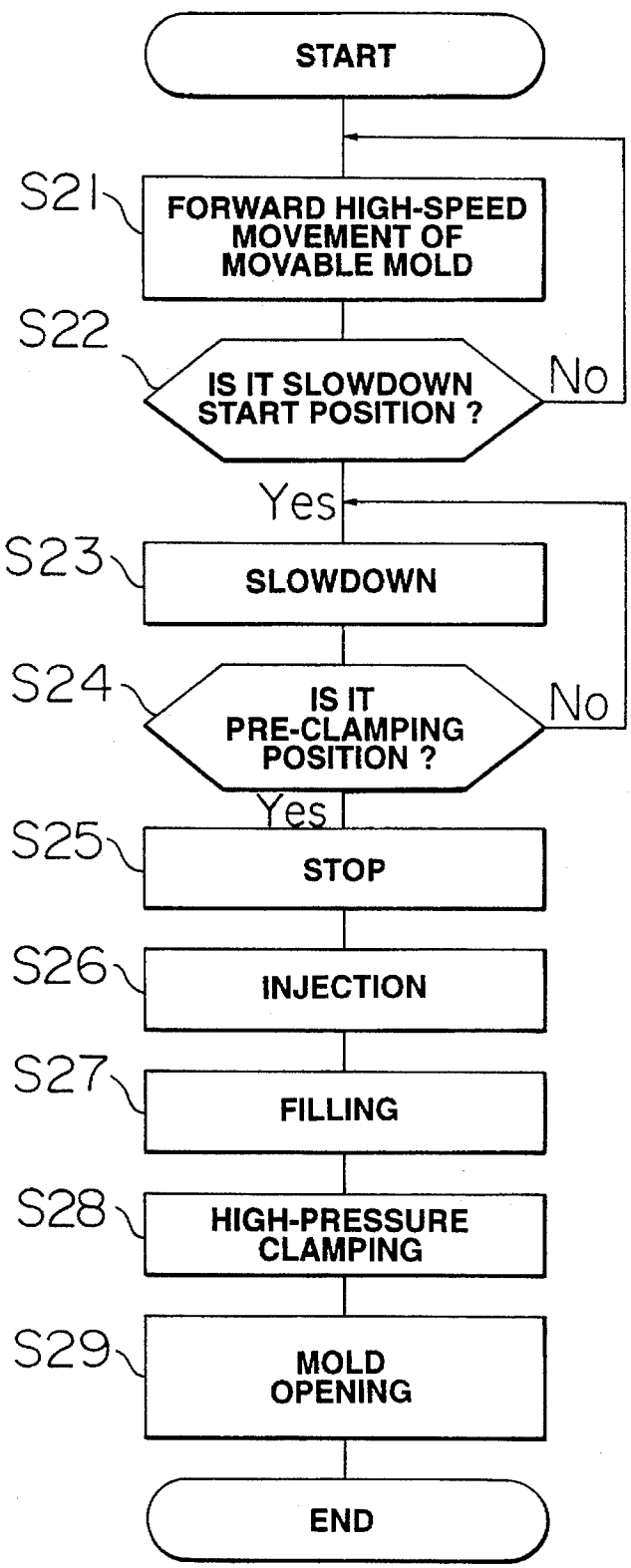
FIG. 4 is a flow chart showing the execution procedure of a general clamping method.

In FIG. 3, the injection and compression molding machine shown by symbol M is provided with an injector 10 and a clamping unit 15. The injector 10 is provided with a barrel cylinder 12 having an injection nozzle 11 at its front end and a not-illustrated hopper at its rear end, a screw 13 is inserted into the barrel cylinder 12, and the rear end of the barrel cylinder 12 is combined with a not-illustrated screw driving section.

The clamping unit 15 is provided with a fixed mold 3 supported by a fixed plate 16 and a movable mold 2 supported by a movable plate 17. The movable plate 17 is slidably supported by a plurality of tie bars 18 . . . whose front ends are secured to the fixed plate 16. Moreover, the rear ends of the tie bars 18 . . . are secured to a clamping cylinder 19. The clamping cylinder 19 has a built-in piston 20. A piston rod 21 which is integrated with the clamping piston 20 protrudes forward from the clamping cylinder 19 and its front end is combined with the movable plate 17. A high-speed cylinder 22 is formed in the clamping piston 20 and a high-speed piston 23 built in the high-speed cylinder 22 is integrally formed at the rear end of the clamping cylinder 19. A front oil chamber and a rear oil chamber of the clamping cylinder 19 are connected to an oil pressure source 25 and an oil tank 26 respectively through a four-port servo valve 24. In FIG. 3, an on-off valve 27 is connected to the front and rear oil chambers of the clamping cylinder.

A position detector 28 using a linear scale for detecting a position of the movable plate 17 (movable mold 2) and positional information detected by the detector is sent to a controller 29. The controller 29 controls a hydraulic circuit set to the clamping unit 15 including the four-port servo valve 24 and the on-off valve 27.

Figure 1:
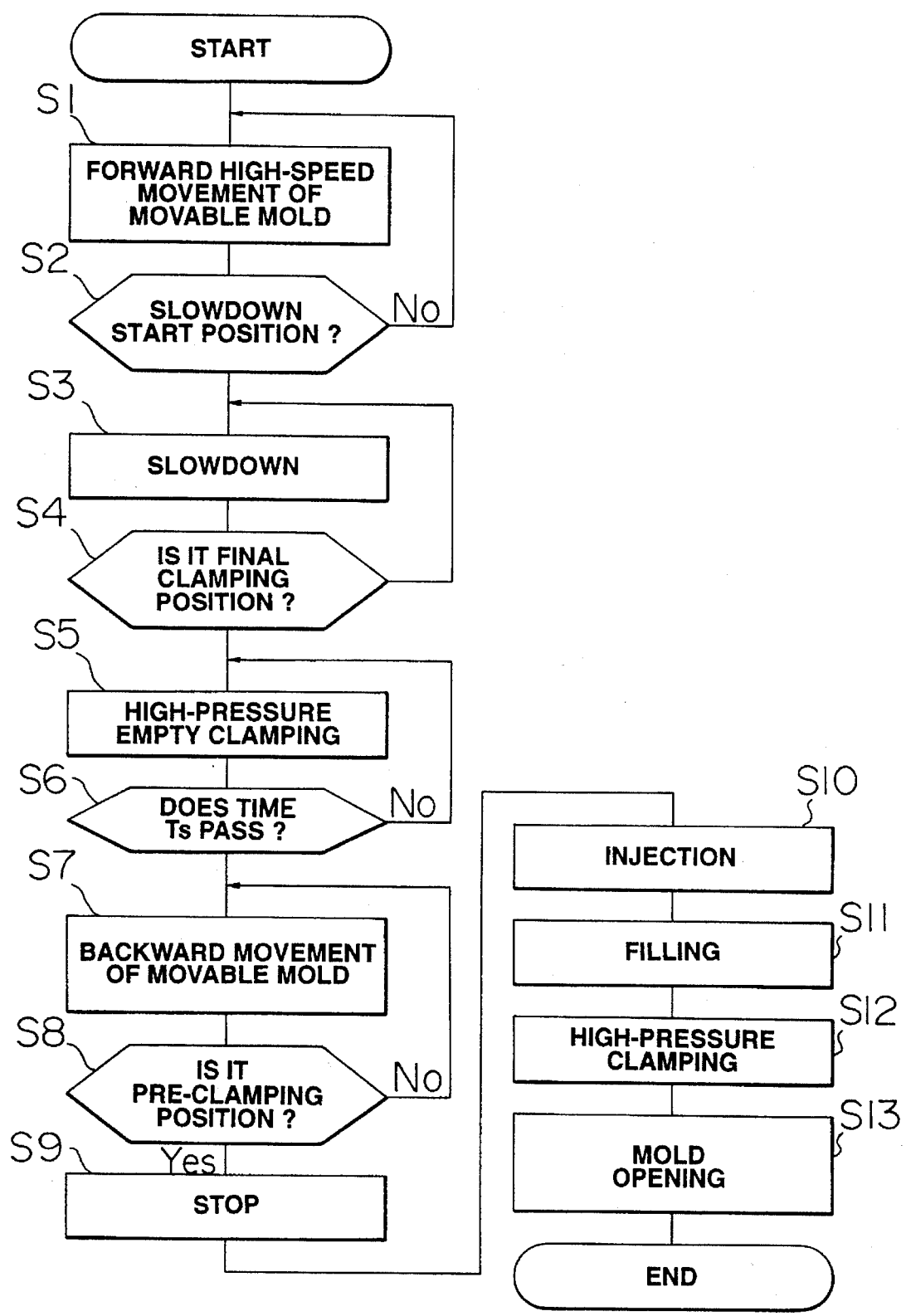
FIG. 1 is a flow chart showing the execution procedure of the clamping method of the present invention.
Figure 2:
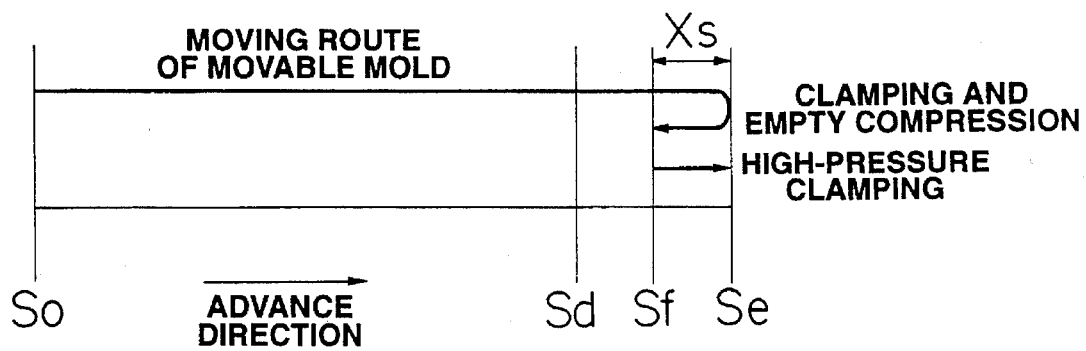
FIG. 2 is an illustration showing the moving route of a movable mold according to the clamping method.

The clamping method of the present invention is described below by referring to the flow chart shown in FIG. 1 and FIG. 2.

First, for clamping, the movable mold 2 is advanced from the mold opening position So to the final clamping position Se. In this case, the movable mold 2 is moved from the mold opening position So to the preset slowdown start position Sd at a high speed (step S1). When the movable mold 2 reaches the slowdown start position Sd, the moving speed of the movable mold 2 is slowly decreased up to the final clamping position Se (steps S2 and S3). The high-speed cylinder 22 is used to move the movable mold 2 at a high speed.

When the movable mold 2 reaches the final clamping position Se, high-pressure empty clamping is performed only for the set time Ts without injecting resin into the mold 2 (steps S4, S5, and S6). The clamping cylinder 19 is used for the high-pressure empty clamping. Thereby because a stress which is the same as that for an actual molding is added to the movable mold 2, the position where the high-pressure empty clamping is performed meets the positional condition when resin is actually injected into the mold. Then, the movable mold 2 is moved backward by the set value Xs from the position where the high-pressure empty clamping is performed (steps S7 and S8). The position to which the mold 2 is moved backward is set as the pre-clamping position Sf. The position Sf serves as an accurate pre-clamping position according to an actual amount of resin to be injected and various error factors such as deformation of a tie bar due to heat or tension, clearance of a mechanical structure, and setting error of a position detector such as a linear scale are eliminated.

Then, the movable mold 2 is stopped at the pre-clamping position Sf to start injection and filling of resin (steps S9 and S10). Then, the movable mold is moved up to the final clamping position during or after injection and filling of resin to perform high-pressure clamping (steps S11 and S12). Hereafter, mold opening including a cooling process is performed (step S13).

Because the movable mold 2 is set to an accurate pre-clamping position by the above clamping method at all times, it is possible to stabilize the weight of a molded part, the amount of gas to be released, and the transfer property. Moreover, because the mold slightly opens at the time of injection and filling of resin, release of gas from the mold is accelerated and the flowability of resin is improved. Furthermore, because high-pressure clamping is performed during or after injection and filling of resin, there is a basic advantage that the transfer property of resin to the mold is improved. Though it is preferable to carry out the clamping method of the present invention every cycle, it is also possible to carry out the method every number of predetermined cycles.

Embodiments of the present invention are described above. However, the present invention is not restricted to the embodiments. Though a case in which the compression by clamping is entirely applied to a mold cavity is shown, it is also possible to partially apply the compression to the cavity. Moreover, it is possible to modify the detailed constitution and technique unless they are deviated from the gist of the present invention.

What is claimed is:

1. A method of clamping an injection and compression molding machine comprising the following steps:

moving a movable mold from a mold opening position to a final clamping empty position prior to starting an injection and filling of resin into the mold;

applying a final clamping pressure to the mold in the final clamping empty position for a predetermined time period;

moving the movable mold by a predetermined distance to a pre-clamping empty position wherein the mold is injected and filled with resin; and moving the movable mold from a pre-clamping filled position to a preset slowdown start molding position wherein the moving speed of the movable mold is slowly decreased from the slowdown start position to a final clamping position.

2. The method of clamping an injection and compression molding machine according to claim 1, wherein the movable mold is moved from the mold opening position to the pre-clamping empty position at a high speed relative to a final clamping position speed.

3. The method of clamping an injection and compression molding machine according to claim 2, wherein the speed of the movable mold is reduced to move to the pre-clamping empty position at a slowdown start position prior to the pre-clamping empty position.

4. The method of clamping an injection and compression molding machine according to claim 1, wherein stress is applied to the movable mold in the pre-clamping empty position for meeting a positional condition when resin is actually injected into the mold.

5. The method of clamping an injection and compression molding machine according to claim 1, wherein a weight of a molded part is stabilized by accurate pre-clamping of the movable mold prior to injection and filling of the mold.

6. The method of clamping an injection and compression molding machine according to claim 1, wherein a release of gas from the mold is accelerated by pre-clamping of the movable mold prior to injection and filling of the mold.

7. The method of clamping an injection and compression molding machine according to claim 1, wherein a flowability of resin is improved by pre-clamping of the movable mold prior to injection and filling of the mold.

* * * * *